(12) United States Patent
Kotani et al.

(10) Patent No.: US 11,189,476 B2
(45) Date of Patent: **\*Nov. 30, 2021**

(54) SAMPLE SUPPORT, IONIZATION METHOD, AND MASS SPECTROMETRY METHOD

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP)

(73) Assignee: HAMAMATSU PHOTONICS K.K., Hamamatsu (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 16/966,758

(22) PCT Filed: Jan. 16, 2019

(86) PCT No.: PCT/JP2019/001113
§ 371 (c)(1),
(2) Date: Jul. 31, 2020

(87) PCT Pub. No.: WO2019/155834
PCT Pub. Date: Aug. 15, 2019

(65) Prior Publication Data
US 2021/0043437 A1  Feb. 11, 2021

(30) Foreign Application Priority Data
Feb. 9, 2018 (JP) .............................. JP2018-021810

(51) Int. Cl.
*H01J 49/16* (2006.01)
*H01J 49/00* (2006.01)
*H01J 49/04* (2006.01)

(52) U.S. Cl.
CPC ........ *H01J 49/164* (2013.01); *H01J 49/0031* (2013.01); *H01J 49/0418* (2013.01)

(58) Field of Classification Search
CPC ................................................ H01J 49/0418
See application file for complete search history.

(56) References Cited

U.S. PATENT DOCUMENTS

2002/0094533 A1  7/2002  Hess et al.
2005/0130222 A1  6/2005  Lee
(Continued)

FOREIGN PATENT DOCUMENTS

JP  2004-354376 A  12/2004
JP  3122331 U   6/2006
(Continued)

OTHER PUBLICATIONS

International Preliminary Report on Patentability dated Aug. 20, 2020 for PCT/JP2019/001113.
Office Action dated Jun. 30, 2021 in U.S. Appl. No. 16/965,460.

*Primary Examiner* — Nicole M Ippolito
*Assistant Examiner* — Hanway Chang
(74) *Attorney, Agent, or Firm* — Faegre Drinker Biddle & Reath LLP

(57) ABSTRACT

Provided is a sample support body for ionization of a sample. The sample support body includes a substrate including a first surface and a second surface on sides opposite to each other, a first conductive layer provided on the first surface, and a second conductive layer provided on the second surface. A plurality of through-holes opening on the first surface and the second surface are formed in a predetermined region of the substrate, the predetermined region being for ionizing components of the sample. A width of a first opening on the first surface side is larger than a width of a second opening on the second surface side in each of the plurality of through-holes.

14 Claims, 11 Drawing Sheets

(56) References Cited

U.S. PATENT DOCUMENTS

| | | |
|---|---|---|
| 2017/0358436 A1 | 12/2017 | Naito et al. |
| 2020/0357621 A1* | 11/2020 | Kotani .................. G01N 27/62 |
| 2021/0057198 A1* | 2/2021 | Kotani .................. G01N 27/64 |

FOREIGN PATENT DOCUMENTS

| | | |
|---|---|---|
| JP | 2007-247070 A | 9/2007 |
| JP | 2009-080106 A | 4/2009 |
| JP | 2009-120892 A | 6/2009 |
| JP | 6093492 B1 | 3/2017 |
| WO | WO-2014/020939 A1 | 2/2014 |
| WO | WO-2017/038709 A1 | 3/2017 |

* cited by examiner

Fig.4
(a) 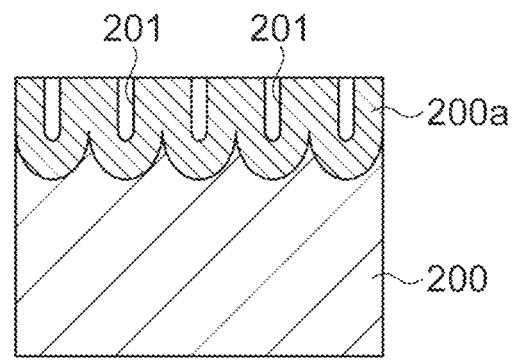
(b) 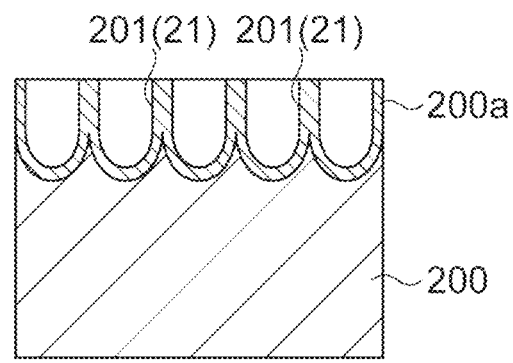
(c) 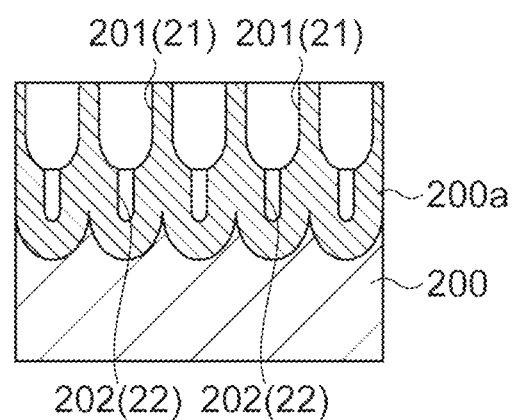
(d) 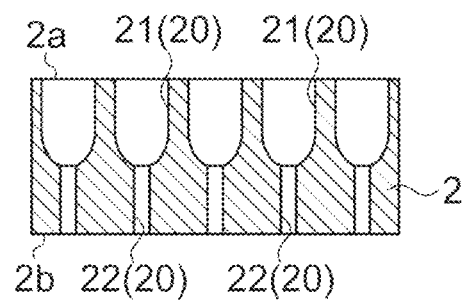

Fig.8

SAMPLE SUPPORT, IONIZATION METHOD, AND MASS SPECTROMETRY METHOD

TECHNICAL FIELD

The present disclosure relates to a sample support body, an ionization method, and a mass spectrometry method.

BACKGROUND ART

Conventionally, a laser desorption/ionization method is known as a method of ionizing a sample such as a biological sample to perform, for instance, mass spectrometry. As a sample support body used in the laser desorption/ionization method, one including a substrate in which a plurality of through-holes are formed and a conductive layer that is provided on at least one surface of the substrate is described in Patent Literature 1.

CITATION LIST

Patent Literature

Patent Literature 1: Japanese Patent No. 6093492

SUMMARY OF INVENTION

Technical Problem

Components of the ionized sample are detected in mass spectrometry, and mass spectrometry of the sample is performed on the basis of detection results. Therefore, an improvement in signal intensity (sensitivity) of the components of an ionized sample is desired in mass spectrometry.

The present disclosure is directed to provide a sample support body, an ionization method, and a mass spectrometry method capable of improving a signal intensity of components of an ionized sample in mass spectrometry.

Solution to Problem

According to an aspect of the present disclosure, there is provided a sample support body for ionization of a sample. The sample support body includes a substrate including a first surface and a second surface on sides opposite to each other, a first conductive layer provided on the first surface, and a second conductive layer provided on the second surface. A plurality of through-holes opening on the first surface and the second surface are formed in a predetermined region of the substrate, the predetermined region being for ionizing components of the sample on. A width of a first opening on the first surface side is larger than a width of a second opening on the second surface side in each of the plurality of through-holes.

In this sample support body, the width of the first opening on the first surface side is larger than the width of the second opening on the second surface side in each of the plurality of through-holes. For this reason, for example, when a solution including the sample is dropped to the plurality of through-holes from the first surface side, the solution moves to the second surface side through the plurality of through-holes, and components of the sample in the solution stay on the first surface side in an appropriate state. Therefore, when the first surface is irradiated with an energy beam while a voltage is applied to the first conductive layer, the components of the sample are reliably ionized. Further, for example, when the sample support body is disposed such that the first surface faces the sample, the components of the sample move smoothly to the second surface side through the plurality of through-holes and stay on the second surface side in an appropriate state. Therefore, when the second surface is irradiated with an energy beam while a voltage is applied to the second conductive layer, the components of the sample are reliably ionized. Thus, according to this sample support body, it is possible to improve the signal intensity of components of an ionized sample in mass spectrometry.

In the sample support body according to the aspect of the present disclosure, when viewed in a direction in which the first surface and the second surface are opposite to each other, an outer edge of the first opening may be located outside an outer edge of the second opening in each of the plurality of through-holes. Accordingly, for example, when a solution including the sample is dropped to the plurality of through-holes from the first surface side, components of the sample in the solution can stay on the first surface side in a more appropriate state. Further, for example, when the sample support body is disposed such that the first surface faces the sample, the components of the sample can move more smoothly to the second surface side through the plurality of through-holes, and the components of the sample can stay on the second surface side in a more appropriate state.

In the sample support body according to the aspect of the present disclosure, each of the plurality of through-holes may include a first portion on the first opening side and a second portion on the second opening side. The first portion may have a funnel shape expanding toward the first opening. Alternatively, in the sample support body according to the aspect of the present disclosure, each of the plurality of through-holes may have a frustum shape expanding toward the first opening. In both cases, for example, when a solution including the sample is dropped to the plurality of through-holes from the first surface side, components of the sample in the solution can stay on the first surface side in an appropriate state. Further, for example, when the sample support body is disposed such that the first surface faces the sample, the components of the sample can move smoothly to the second surface side through the plurality of through-holes, and the components of the sample can stay on the second surface side in an appropriate state.

In the sample support body according to the aspect of the present disclosure, a minimum value of the width may be 1 nm and a maximum value of the width may be 700 nm in each of the plurality of through-holes. Accordingly, for example, when a solution including the sample is dropped to the plurality of through-holes from the first surface side, components of the sample in the solution can stay on the first surface side in an appropriate state. Further, for example, when the sample support body is disposed such that the first surface faces the sample, the components of the sample can move smoothly to the second surface side through the plurality of through-holes, and the components of the sample can stay on the second surface side in an appropriate state.

According to another aspect of the present disclosure, there is provided a sample support body for ionization of a sample. The sample support body includes a conductive substrate including a first surface and a second surface on sides opposite to each other. A plurality of through-holes opening on the first surface and the second surface are formed in a predetermined region of the substrate, the predetermined region being for ionizing components of the sample. A width of a first opening on the first surface side is larger than a width of a second opening on the second surface side in each of the plurality of through-holes.

In this sample support body, the width of the first opening on the first surface side is larger than the width of the second opening on the second surface side in each of the plurality of through-holes. For this reason, for example, when a solution including the sample is dropped to the plurality of through-holes from the first surface side, the solution moves to the second surface side through the plurality of through-holes, and components of the sample in the solution stay on the first surface side in an appropriate state. Therefore, when the first surface is irradiated with an energy beam while a voltage is applied to the substrate, the components of the sample are reliably ionized. Further, for example, when the sample support body is disposed such that the first surface faces the sample, the components of the sample move smoothly to the second surface side through the plurality of through-holes, and stay on the second surface side in an appropriate state. Therefore, when the second surface is irradiated with an energy beam while a voltage is applied to the substrate, the components of the sample are reliably ionized. Thus, according to this sample support body, it is possible to improve the signal intensity of components of an ionized sample in mass spectrometry.

According to another aspect of the present disclosure, there is provided an ionization method including a first process of preparing the sample support body provided with the first conductive layer and the second conductive layer described above, a second process of mounting the sample support body on a mount surface of a mount portion such that the second surface faces the mount surface, and dropping a solution including the sample to the plurality of through-holes from the first surface side, and a third process of ionizing components of the sample staying on the first surface side by irradiating the first surface with an energy beam while applying a voltage to the first conductive layer.

According to another aspect of the present disclosure, there is provided an ionization method including a first process of preparing the sample support body provided with the first conductive layer and the second conductive layer described above, a second process of mounting the sample on a mount surface of a mount portion, and mounting the sample support body on the mount surface such that the first surface faces the sample, and a third process of ionizing components of the sample having moved to the second surface side through the plurality of through-holes by irradiating the second surface with an energy beam while applying a voltage to the second conductive layer.

According to these ionization methods, since the sample support body provided with the first conductive layer and the second conductive layer described above is used, it is possible to improve the signal intensity of components of an ionized sample in mass spectrometry.

According to another aspect of the present disclosure, there is provided a mass spectrometry method including the first process, the second process, and the third process of the ionization method described above; and a fourth process of detecting the components ionized in the third process.

According to this mass spectrometry method, since the sample support body provided with the first conductive layer and the second conductive layer described above is used, it is possible to improve the signal intensity of components of an ionized sample in mass spectrometry.

According to another aspect of the present disclosure, there is provided an ionization method including a first process of preparing the sample support body provided with the conductive substrate described above, a second process of mounting the sample support body on a mount surface of a mount portion such that the second surface faces the mount surface, and dropping a solution including the sample to the plurality of through-holes from the first surface side, and a third process of ionizing components of the sample staying on the first surface side by irradiating the first surface with an energy beam while applying a voltage to the substrate.

According to another aspect of the present disclosure, there is provided an ionization method including a first process of preparing the sample support body provided with the conductive substrate described above, a second process of mounting the sample on a mount surface of a mount portion, and mounting the sample support body on the mount surface such that the first surface faces the sample, and a third process of ionizing components of the sample having moved to the second surface side through the plurality of through-holes by irradiating the second surface with an energy beam while applying a voltage to the substrate.

According to these ionization methods, since the sample support body provided with the conductive substrate described above is used, it is possible to improve the signal intensity of components of an ionized sample in mass spectrometry.

According to another aspect of the present disclosure, there is provided a mass spectrometry method including the first process, the second process, and the third process of the ionization method described above; and a fourth process of detecting the components ionized in the third process.

According to this mass spectrometry method, since the sample support body provided with the conductive substrate described above is used, it is possible to improve the signal intensity of components of an ionized sample in mass spectrometry.

Advantageous Effects of Invention

According to the present disclosure, a sample support body, an ionization method, and a mass spectrometry method capable of improving a signal intensity of components of an ionized sample in mass spectrometry can be provided.

BRIEF DESCRIPTION OF DRAWINGS

FIG. 4 is a view illustrating a process of manufacturing the substrate of the sample support body illustrated in FIG. 1.

FIG. 8 is a view illustrating a process of the mass spectrometry method according to another embodiment.

DESCRIPTION OF EMBODIMENTS

Hereinafter, embodiments of the present disclosure will be described in detail with reference to the drawings. The same or equivalent portions are denoted by the same reference signs in each of the drawings, and duplicate description thereof will be omitted.

Figure 1:
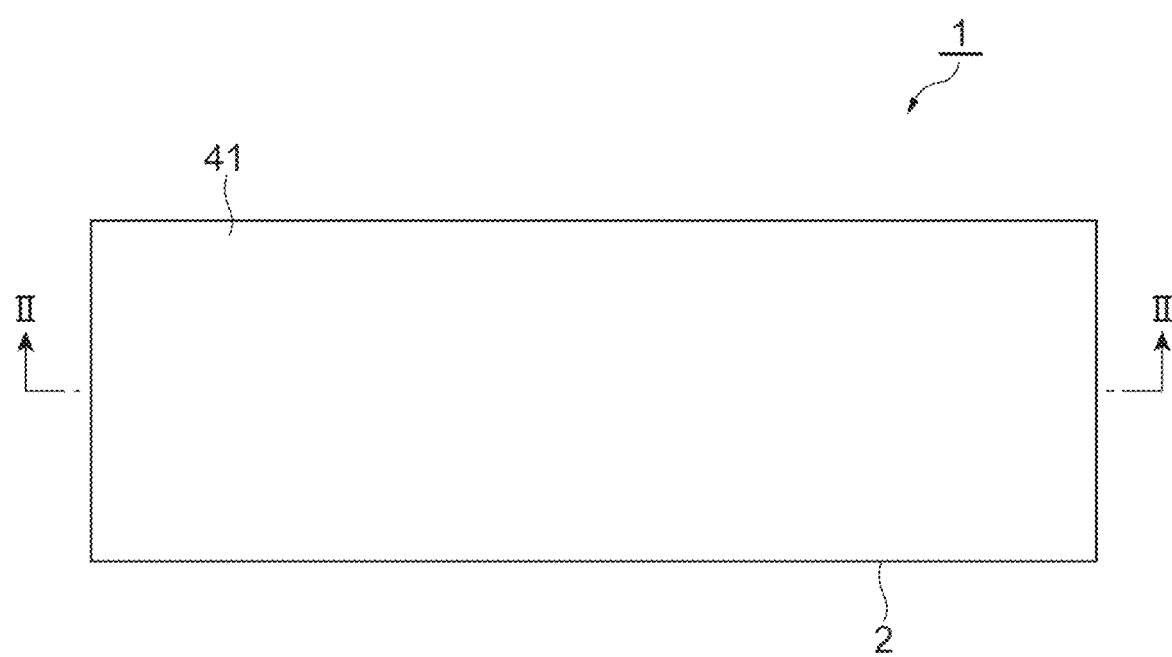
FIG. 1 is a plan view of a sample support body according to an embodiment.
Figure 2:
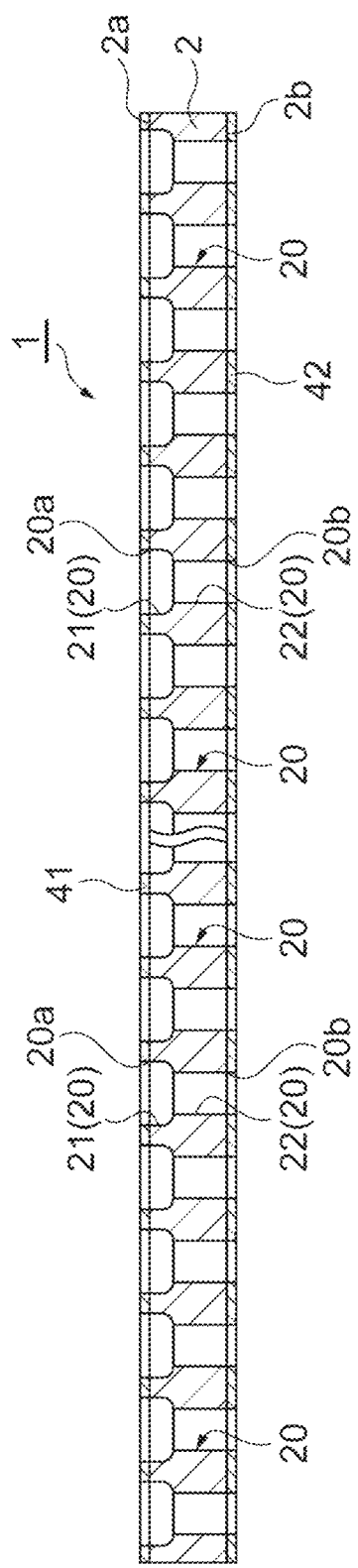
FIG. 2 is a sectional view of the sample support body illustrated in FIG. 1 along line II-II.

As illustrated in FIGS. 1 and 2, a sample support body 1 is used for ionization of a sample and includes a substrate 2, a first conductive layer 41, and a second conductive layer 42. The substrate 2 includes a first surface 2a and a second surface 2b on sides opposite to each other. A plurality of through-holes 20 are formed in the substrate 2 in a uniform way (in a uniform distribution). Each of the through-holes 20 extends in a thickness direction (direction in which the first surface 2a and the second surface 2b are opposite to each other) of the substrate 2 and opens on the first surface 2a and the second surface 2b.

The substrate 2 is formed of, for instance, an insulating material in a shape of a rectangular plate. When viewed in the thickness direction of the substrate 2, a length of one side of the substrate 2 is, for instance, approximately several centimeters, and a thickness of the substrate 2 is, for instance, within a range of approximately 1 µm to 50 µm. In each of the through-holes 20, a width of a first opening 20a on the first surface 2a side is larger than a width of a second opening 20b on the second surface 2b side. When viewed in the thickness direction of the substrate 2, an outer edge of the first opening 20a is located outside an outer edge of the second opening 20b in each of the through-holes 20. That is, when viewed in the thickness direction of the substrate 2, the outer edge of the first opening 20a encompasses the outer edge of the second opening 20b in each of the through-holes 20.

The width of the first opening 20a denotes the diameter of the first opening 20a in a case in which the first opening 20a has a nearly circular shape when viewed in the thickness direction of the substrate 2 and denotes the diameter (effective diameter) of a virtual largest circle fitted into the shape in a case in which it has a shape other than a nearly circular shape. Likewise, the width of the second opening 20b denotes the diameter of the second opening 20b in a case in which the second opening 20b has a nearly circular shape when viewed in the thickness direction of the substrate 2 and denotes the diameter (effective diameter) of a virtual largest circle fitted into the shape in a case in which it has a shape other than a nearly circular shape. In the present embodiment, the width of the first opening 20a is approximately twice the width of the second opening 20b.

Each of the through-holes 20 includes a first portion 21 on the first opening 20a side and a second portion 22 on the second opening 20b side. The first portion 21 has a funnel shape expanding toward the first opening 20a. The second portion 22 has a columnar shape. A center line of the first portion 21 and a center line of the second portion 22 coincide with each other. In each of the through-holes 20, a minimum value of the width is 1 nm and a maximum value of the width is 700 nm. Here, the width of the through-hole 20 denotes the diameter of the through-hole 20 in a case in which a sectional shape of the through-holes 20 perpendicular to the thickness direction of the substrate 2 is a nearly circular shape and denotes the diameter (effective diameter) of a virtual largest circle fitted into the sectional shape in a case in which it has a sectional shape other than a nearly circular shape. In the present embodiment, the minimum value of the width is the diameter of the second portion 22 and the maximum value of the width is the diameter of the first opening 20a.

The first conductive layer 41 is provided on the first surface 2a of the substrate 2. The first conductive layer 41 covers a part on the first surface 2a of the substrate 2 in which no through-hole 20 is formed. The second conductive layer 42 is provided on the second surface 2b of the substrate 2. The second conductive layer 42 covers a part on the second surface 2b of the substrate 2 in which no through-hole 20 is formed.

The first conductive layer 41 and the second conductive layer 42 are formed of a conductive material. In the present embodiment, the first conductive layer 41 and the second conductive layer 42 are formed of platinum (Pt) or gold (Au). In this way, for the reason described below, a metal having a low affinity (reactivity) with a sample and high conductivity is preferably used as a material for the first conductive layer 41 and the second conductive layer 42.

For example, if the first conductive layer 41 and the second conductive layer 42 are formed of a metal such as copper (Cu) that has a high affinity with a sample such as protein, a sample is ionized in a state in which Cu atoms adhere to sample molecules in a process (which will be described below) of ionizing the sample, and there is concern that detection results may deviate in mass spectrometry (which will be described below) according to the adhered amount of the Cu atoms. Therefore, a metal having a low affinity with a sample is preferably used as a material for the first conductive layer 41 and the second conductive layer 42.

Meanwhile, it becomes easier to apply a constant voltage to a metal having higher conductivity in an easy and stable way. For this reason, if the first conductive layer 41 and the second conductive layer 42 are formed of a highly conductive metal, a voltage can be uniformly applied to the first surface 2a and the second surface 2b of the substrate 2. Further, a metal having higher conductivity tends to have higher thermal conductivity. For this reason, if the first conductive layer 41 and the second conductive layer 42 are formed of a highly conductive metal, an energy of a laser beam (energy beam) with which the substrate 2 has been irradiated can be efficiently transmitted to a sample through the first conductive layer 41 and the second conductive layer 42. Therefore, a highly conductive metal is preferably used as a material for the first conductive layer 41 and the second conductive layer 42.

From the foregoing viewpoints, for example, Pt, Au, or the like is preferably used as a material for the first conductive layer 41 and the second conductive layer 42. For example, the first conductive layer 41 and the second conductive layer 42 are formed to have a thickness within a range of approximately 1 nm to 350 nm using a plating method, an atomic layer deposition (ALD) method, a vapor deposition method, a sputtering method, or the like. For example, chromium (Cr), nickel (Ni), titanium (Ti), or the like may be used as a material for the first conductive layer 41 and the second conductive layer 42.

Figure 3:
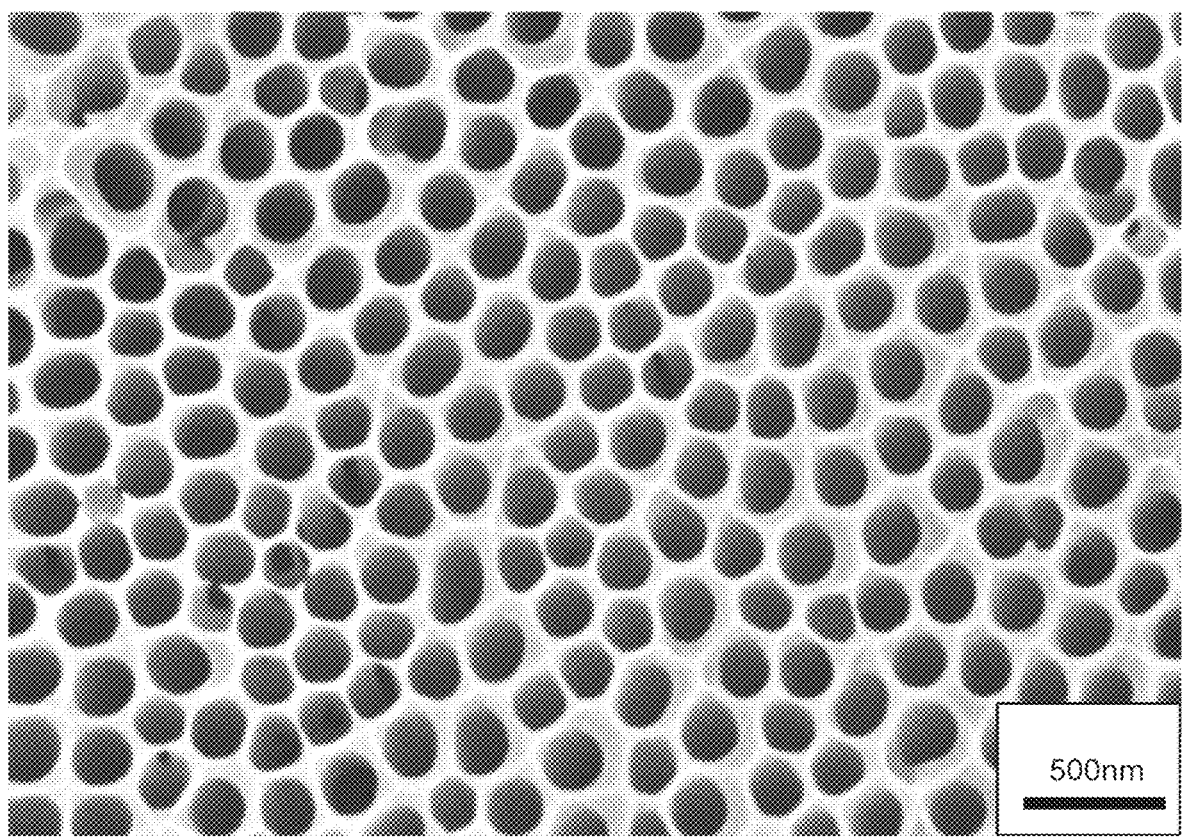
FIG. 3 is a view illustrating an enlarged image of a substrate of the sample support body illustrated in FIG. 1.

FIG. 3 is a view illustrating an enlarged image of the substrate 2 viewed in the thickness direction of the substrate 2. In FIG. 3, darker parts indicate the through-holes 20, and brighter parts indicate partition wall portions between the through-holes 20. As illustrated in FIG. 3, the plurality of through-holes 20 having a substantially regular width are uniformly formed in the substrate 2. An aperture ratio (ratio of all the through-holes 20 to the substrate 2 when viewed in the thickness direction of the substrate 2) of the through-holes 20 is practically within a range of 10% to 80%, and is particularly preferable within a range of 60% to 80%. The sizes of the plurality of through-holes 20 may be uneven, and the plurality of through-holes 20 may be partially connected to one another.

The substrate 2 illustrated in FIG. 3 is an alumina porous film formed by anodizing aluminum (Al). To be specific, as illustrated in (a) of FIG. 4, a surface part 200a of an Al substrate 200 is oxidized by performing anodization treatment on the Al substrate 200, and a plurality of pores 201 are formed in the surface part 200a of the Al substrate 200. Subsequently, as illustrated in (b) of FIG. 4, the diameter of each of the pores 201 is increased by performing pore widening treatment on the Al substrate 200. Each of the pores 201 having an increased diameter corresponds to the first portion 21 of the substrate 2. Subsequently, as illustrated in (c) of FIG. 4, the surface part 200a of the Al substrate 200 is oxidized more deeply by performing anodization treatment on the Al substrate 200, and pores 202 are formed at the bottoms of the respective pores 201 having an increased diameter. Each of the pores 202 corresponds to the second portion 22 of the substrate 2. Subsequently, the substrate 2 is obtained as illustrated in (d) of FIG. 4 by peeling the oxidized surface part 200a from the Al substrate 200.

The substrate 2 may be formed by anodizing a valve metal other than Al, such as tantalum (Ta), niobium (Nb), titanium (Ti), hafnium (Hf), zirconium (Zr), zinc (Zn), tungsten (W), bismuth (Bi), or antimony (Sb). Alternatively, the substrate 2 may be formed by anodizing silicon (Si).

Figure 5:
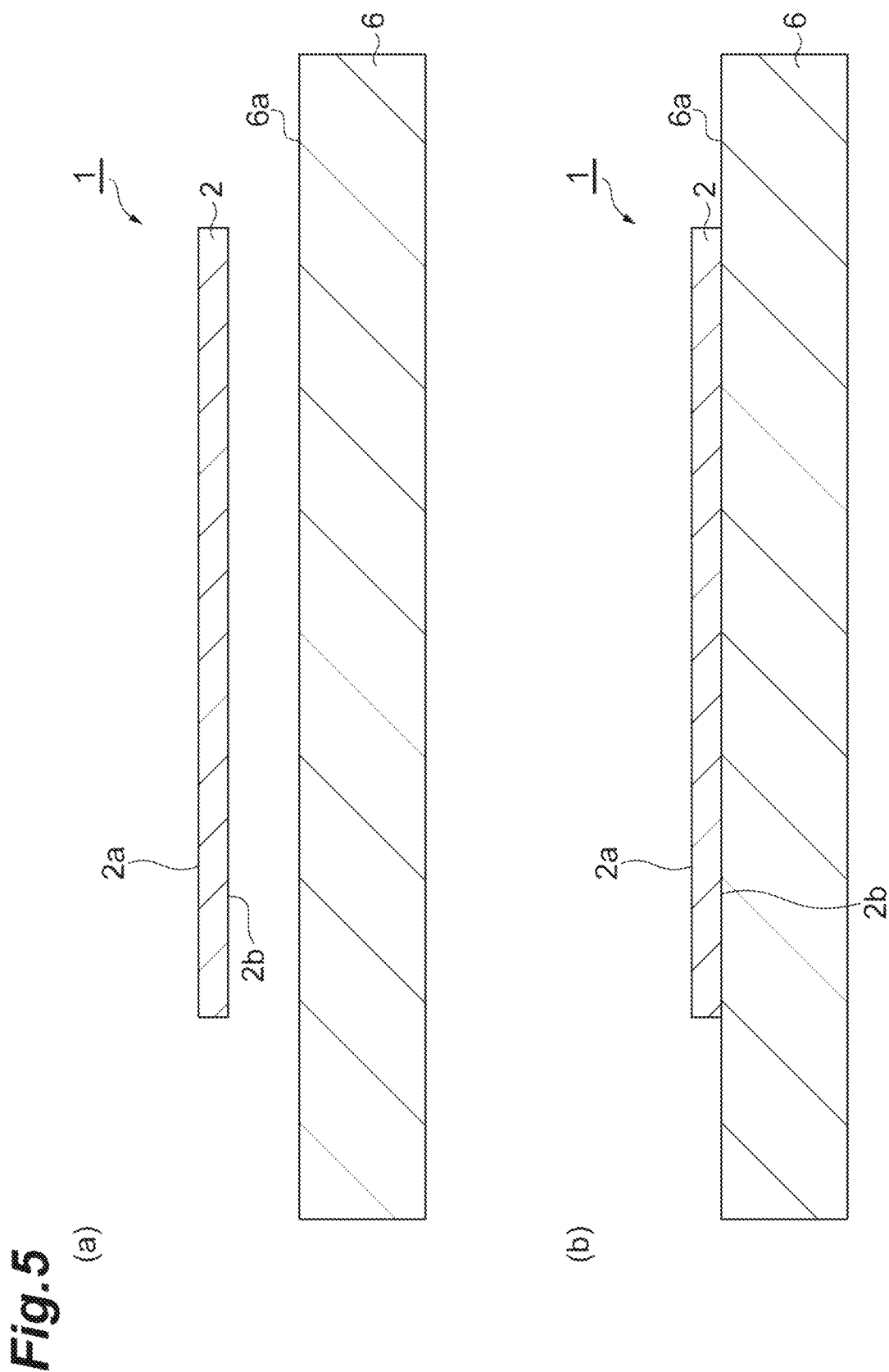
FIG. 5 is a view illustrating a process of a mass spectrometry method according to the embodiment.
Figure 6:
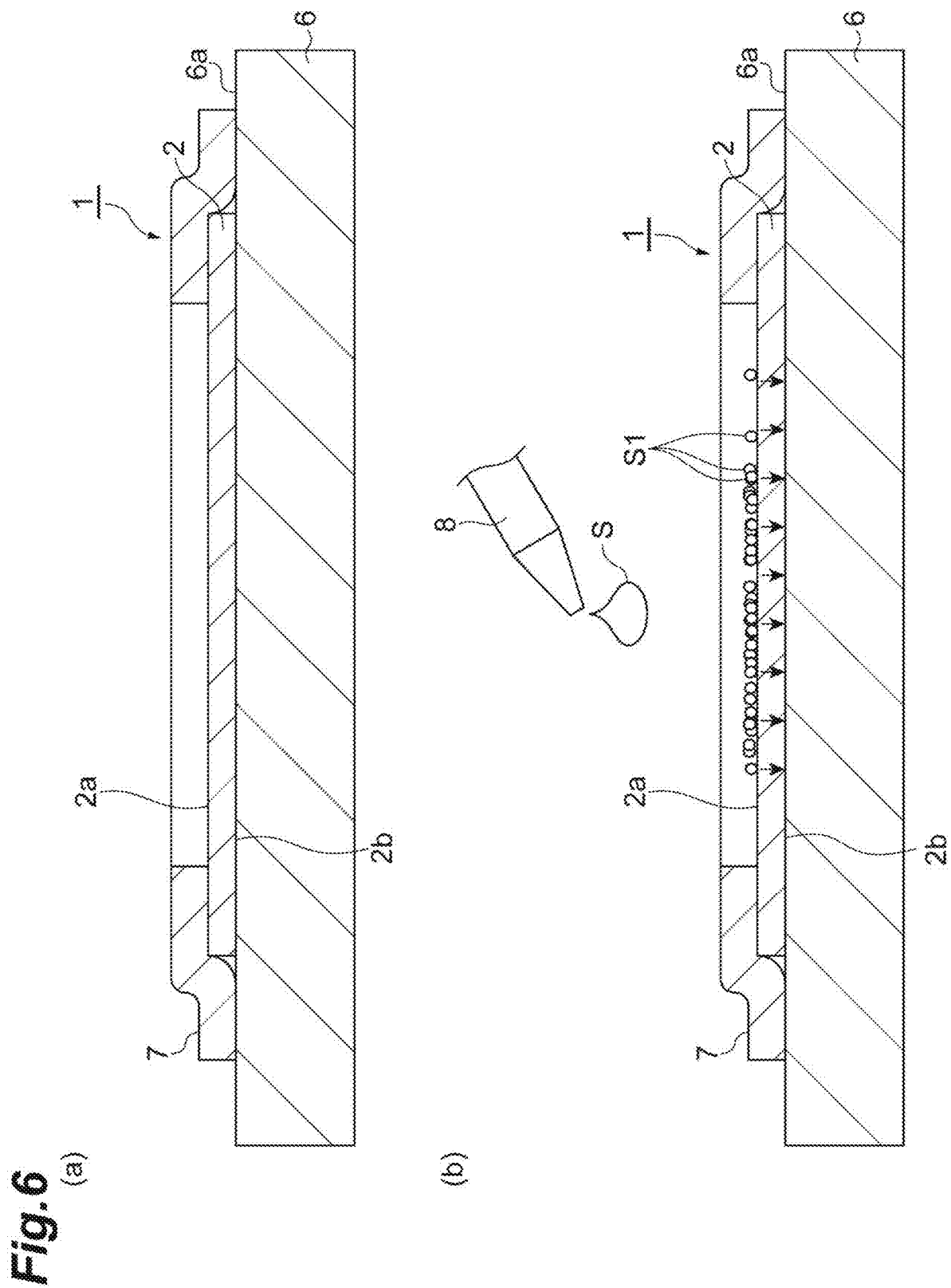
FIG. 6 is a view illustrating a process of the mass spectrometry method according to the embodiment.
Figure 7:
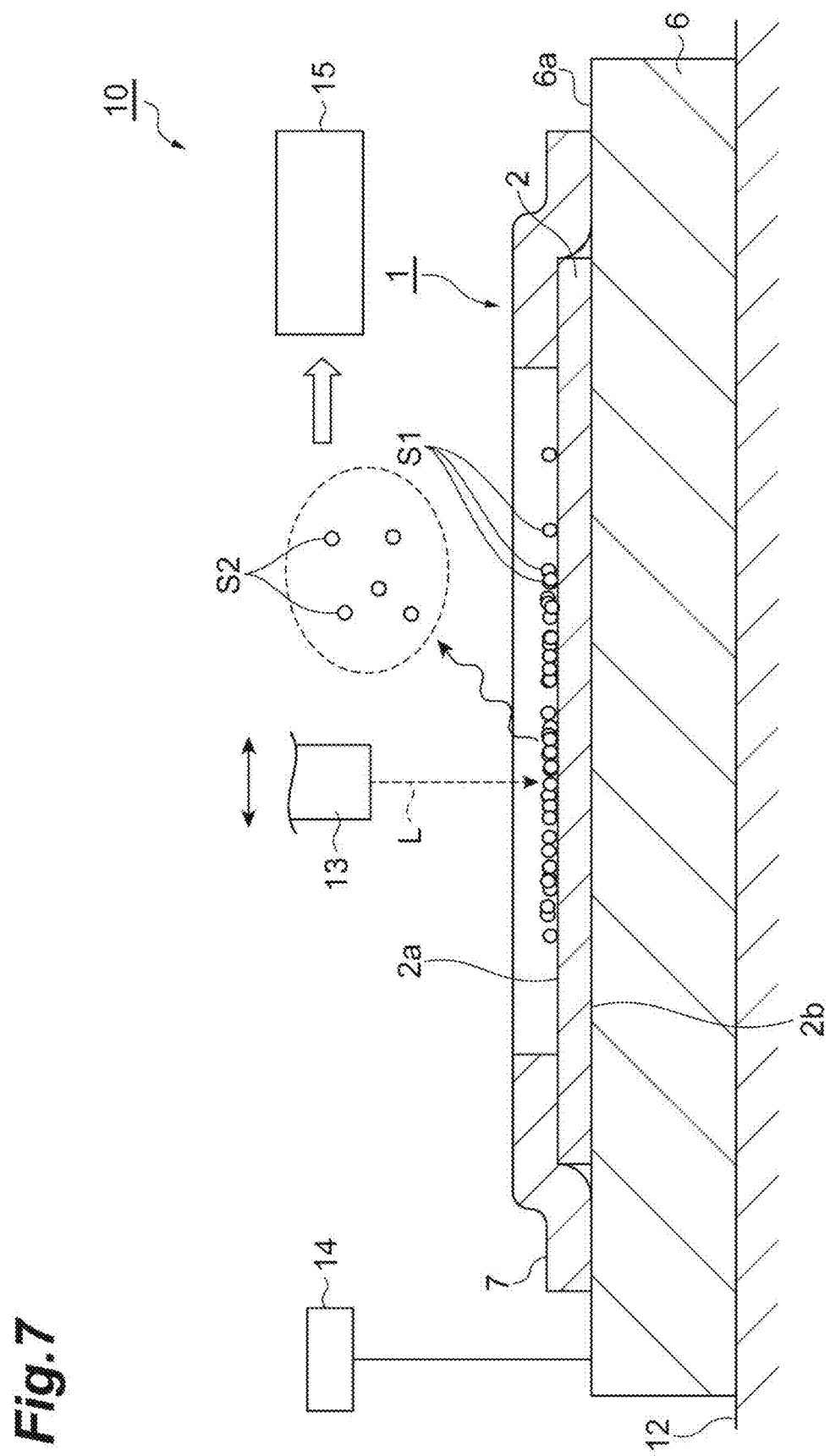
FIG. 7 is a view illustrating a process of the mass spectrometry method according to the embodiment.

Next, an ionization method and a mass spectrometry method according to the embodiment using the sample support body 1 will be described. In FIGS. 5 to 7, the through-holes 20, the first conductive layer 41, and the second conductive layer 42 are not illustrated in the sample support body 1. Further, for convenience of illustration, the sample support body 1 illustrated in FIGS. 1 and 2 and the sample support body 1 illustrated in FIGS. 5 to 7 differ from each other in dimensional ratio or the like.

First, as illustrated in (a) of FIG. 5, the aforementioned sample support body 1 is prepared (first process). The sample support body 1 may be prepared by being manufactured by a person who carries out the ionization method and the mass spectrometry method or may be prepared by being obtained from a manufacturer, a seller, or the like of the sample support body 1.

Subsequently, as illustrated in (b) of FIG. 5, the sample support body 1 is mounted on a mount surface 6a of a slide glass (mount portion) 6 such that the second surface 2b of the substrate 2 faces the mount surface 6a (second process). The slide glass 6 is a glass substrate on which a transparent conductive film such as an indium tin oxide (ITO) film is formed, and a surface of the transparent conductive film serves as the mount surface 6a. Without being limited to the slide glass 6, a member capable of ensuring conductivity (for example, a substrate formed of a metal material such as stainless steel) may be used as a mount portion. Subsequently, as illustrated in (a) of FIG. 6, the sample support body 1 is fixed to the slide glass 6 using a conductive tape 7 (for example, a carbon tape). Subsequently, as illustrated in (b) of FIG. 6, a solution including a sample S is dropped to the plurality of through-holes 20 from the first surface 2a side using a pipette 8 (second process).

Accordingly, in each of the through-holes 20, the solution including the sample S enters the inside of the second portion 22 from the first portion 21, and a part of the solution including the sample S stays in the first portion 21 of each of the through-holes 20 due to surface tension (see FIG. 2). Therefore, components S1 of the sample S in the solution reliably stay on the first surface 2a side of the substrate 2.

Subsequently, as illustrated in FIG. 7, in a state in which the sample support body 1 where the components S1 of the sample S stay on the first surface 2a side is fixed to the slide glass 6, the slide glass 6, the sample support body 1, and the sample S are mounted on a support portion 12 (for example, a stage) of a mass spectrometer 10. Subsequently, a voltage is applied to the first conductive layer 41 (see FIG. 2) of the sample support body 1 through the mount surface 6a of the slide glass 6 and the tape 7 by a voltage application part 14 of the mass spectrometer 10 (third process). Subsequently, the first surface 2a of the substrate 2 is irradiated with a laser beam (energy beam) L by a laser beam irradiation part 13 of the mass spectrometer 10 (third process). In the present embodiment, the laser beam irradiation part 13 scans a predetermined region on the first surface 2a with the laser beam L. The predetermined region on the first surface 2a can be scanned with the laser beam L by operating at least one of the support portion 12 and the laser beam irradiation part 13.

In this way, when the first surface 2a of the substrate 2 is irradiated with the laser beam L while a voltage is applied to the first conductive layer 41, the components S1 of the sample S staying on the first surface 2a side of the substrate 2 are ionized, and sample ions S2 (ionized components S1) are discharged (third process). To be specific, an energy is transmitted from the first conductive layer 41 (see FIG. 2) which has absorbed an energy of the laser beam L to the components S1 of the sample S staying on the first surface 2a side of the substrate 2. Then, the components S1 of the sample S which have obtained the energy are gasified and obtain electric charges, thereby becoming the sample ions S2. The foregoing first to third processes correspond to the ionization method according to the embodiment (in the present embodiment, a laser desorption/ionization method) using the sample support body 1.

The discharged sample ions S2 move while accelerating toward a ground electrode (not illustrated) provided between the sample support body 1 and an ion detection unit 15. That is, the sample ions S2 move while accelerating toward the ground electrode due to a potential difference between the first conductive layer 41 to which a voltage is applied and the ground electrode. The sample ions S2 are detected by the ion detection unit 15 of the mass spectrometer 10 (fourth process). In the present embodiment, the mass spectrometer 10 is a scanning mass spectrometer utilizing a time-of-flight mass spectrometry (TOF-MS) method. The foregoing first to fourth processes correspond to the mass spectrometry method according to the embodiment using the sample support body 1.

Figure 8:
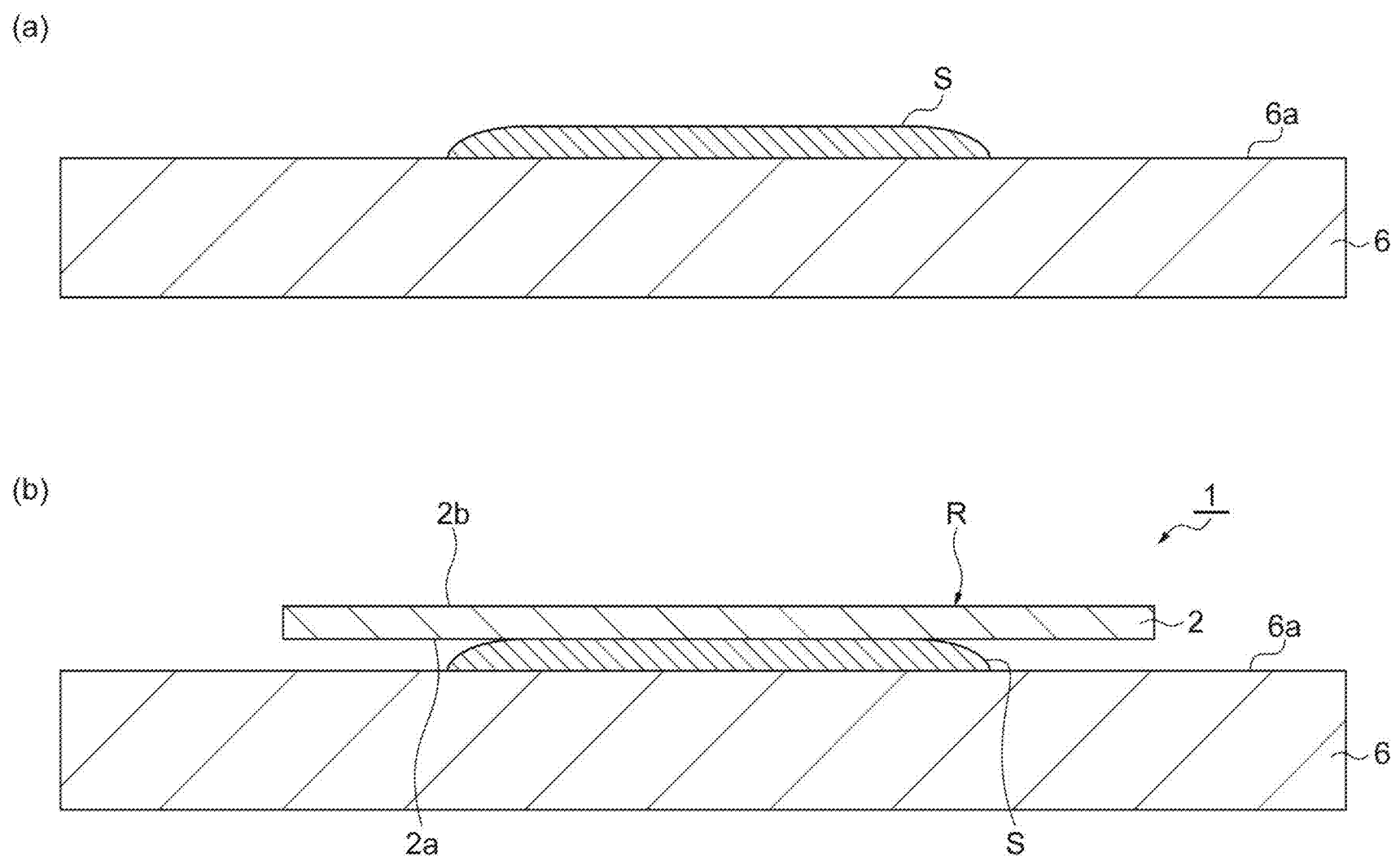
Figure 9:
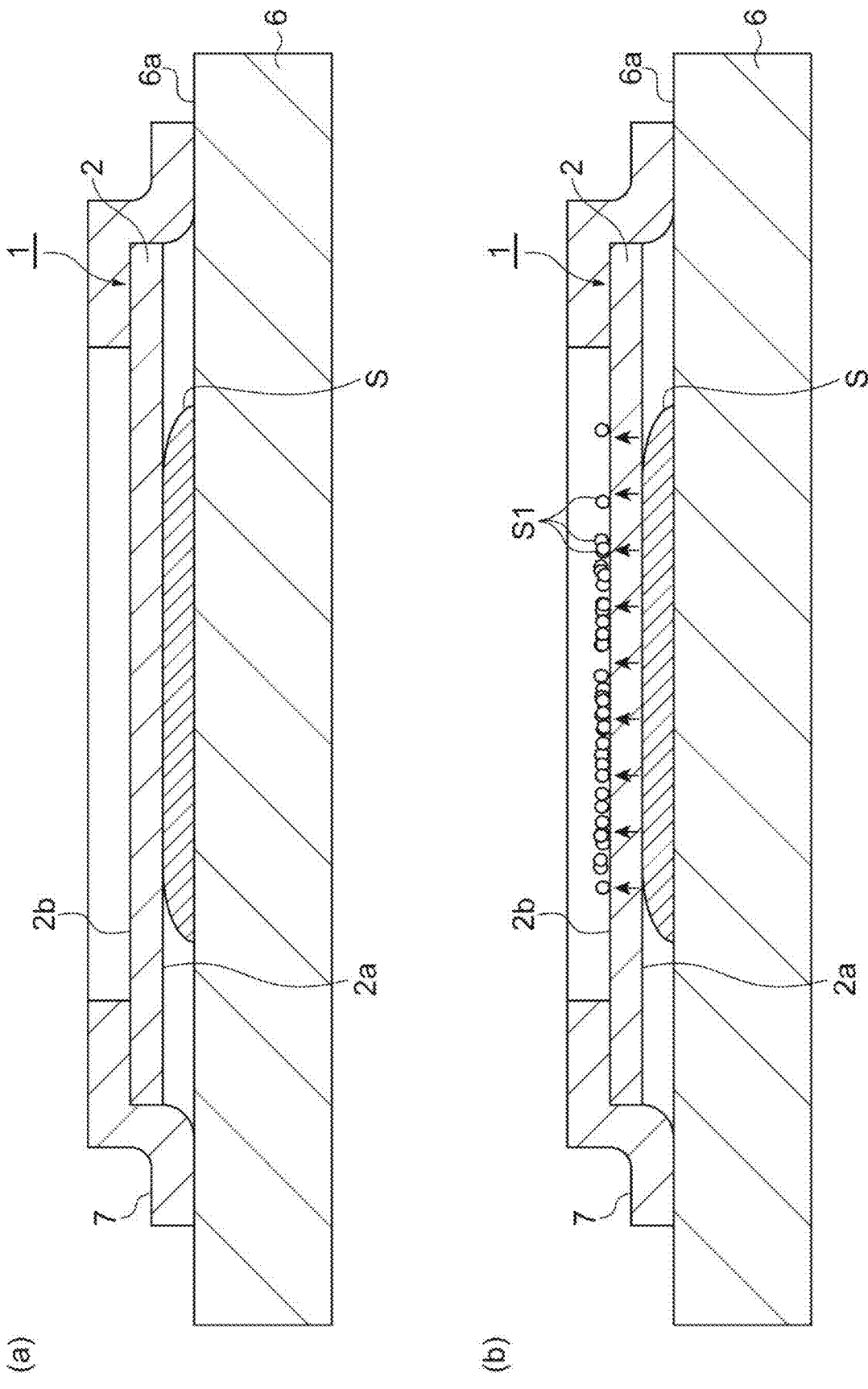
FIG. 9 is a view illustrating a process of the mass spectrometry method according to another embodiment.
Figure 10:
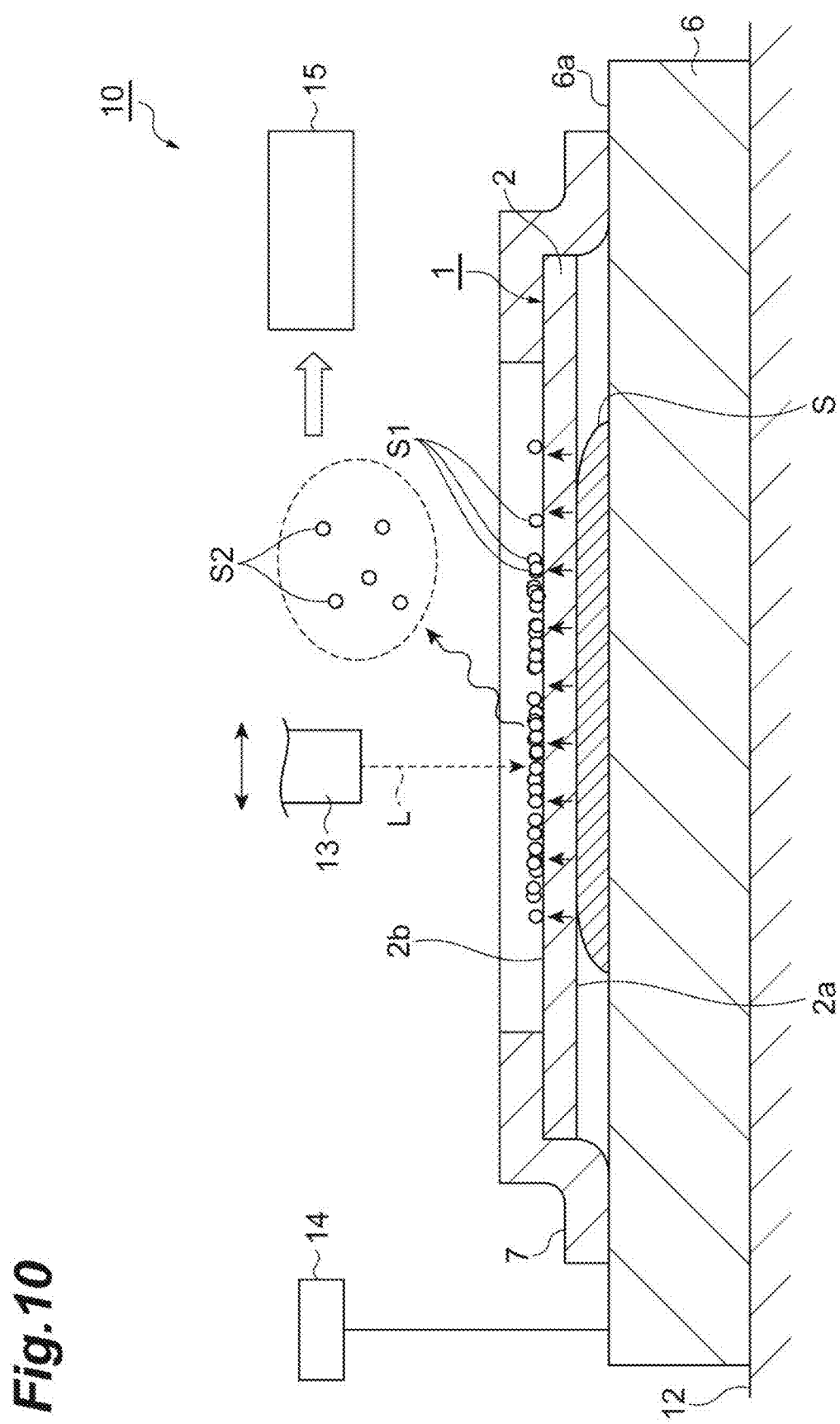
FIG. 10 is a view illustrating a process of the mass spectrometry method according to another embodiment.

Next, an ionization method and a mass spectrometry method according to another embodiment using the sample support body 1 will be described. In FIGS. 8 to 10, the through-holes 20, the first conductive layer 41, and the second conductive layer 42 are not illustrated in the sample support body 1. Further, for convenience of illustration, the sample support body 1 illustrated in FIGS. 1 and 2 and the sample support body 1 illustrated in FIGS. 8 to 10 differ from each other in dimensional ratio or the like.

First, the aforementioned sample support body 1 is prepared (first process). The sample support body 1 may be prepared by being manufactured by a person who carries out the ionization method and the mass spectrometry method or may be prepared by being obtained from a manufacturer, a seller, or the like of the sample support body 1.

Subsequently, as illustrated in (a) of FIG. 8, the sample S is mounted on the mount surface 6a of the slide glass 6 (second process). For example, the sample S is a thin film-shaped biological sample (water-containing sample) such as a tissue slice. Subsequently, as illustrated in (b) of FIG. 8, the sample support body 1 is mounted on the mount surface 6a such that the first surface 2a of the substrate 2 faces the sample S (second process). Subsequently, as illustrated in (a) of FIG. 9, the sample support body 1 is fixed to the slide glass 6 using the conductive tape 7.

Accordingly, as illustrated in (b) of FIG. 9, due to a capillary phenomenon, the components S1 of the sample S move to the second surface 2b side of the substrate 2 through the plurality of through-holes 20 (see FIG. 2), and the components S1 of the sample S which have moved stay on the second surface 2b side due to surface tension. Therefore, the components S1 of the sample S reliably stay on the second surface 2b side of the substrate 2.

Subsequently, as illustrated in FIG. 10, in a state in which the sample S is disposed between the slide glass 6 and the sample support body 1, the slide glass 6, the sample support body 1, and the sample S are mounted on the support portion 12 of the mass spectrometer 10. Subsequently, a voltage is applied to the second conductive layer 42 of the sample support body 1 through the mount surface 6a of the slide glass 6 and the tape 7 by a voltage application part 14 of the mass spectrometer 10 (third process). Subsequently, the second surface 2b of the substrate 2 is irradiated with the laser beam (energy beam) L by the laser beam irradiation part 13 of the mass spectrometer 10 (third process). In the present embodiment, the laser beam irradiation part 13 scans the predetermined region on the second surface 2b with the laser beam L. The predetermined region on the second surface 2b can be scanned with the laser beam L by operating at least one of the support portion 12 and the laser beam irradiation part 13.

In this way, when the second surface 2b of the substrate 2 is irradiated with the laser beam L while a voltage is applied to the second conductive layer 42, the components S1 of the sample S which have moved to the second surface 2b side of the substrate 2 through the plurality of through-holes 20 are ionized, and the sample ions S2 (ionized components S1) are discharged (third process). To be specific, an energy is transmitted from the second conductive layer 42 (see FIG. 2) which has absorbed an energy of the laser beam L to the components S1 of the sample S staying on the second surface 2b side of the substrate 2. Then, the components S1 of the sample S which have obtained the energy are gasified and obtain electric charges, thereby becoming the sample ions S2. The foregoing first to third processes correspond to the ionization method according to another embodiment (in the present embodiment, a laser desorption/ionization method) using the sample support body 1.

The discharged sample ions S2 move while accelerating toward a ground electrode (not illustrated) provided between the sample support body 1 and the ion detection unit 15. That is, the sample ions S2 move while accelerating toward the ground electrode due to a potential difference between the second conductive layer 42 to which a voltage is applied and the ground electrode. The sample ions S2 are detected by the ion detection unit 15 of the mass spectrometer 10 (fourth process). In the present embodiment, the ion detection unit 15 detects the sample ions S2 in way of corresponding to a scanning position of the laser beam L. Accordingly, a two-dimensional distribution of molecules constituting the sample S can be imaged. Further, in the present embodiment, the mass spectrometer 10 is a scanning mass spectrometer utilizing a time-of-flight mass spectrometry method. The foregoing first to fourth processes correspond to the mass spectrometry method according to another embodiment using the sample support body 1.

As described above, in the sample support body 1, the width of the first opening 20a on the first surface 2a side is larger than the width of the second opening 20b on the second surface 2b side in each of the plurality of through-holes 20. For this reason, for example, if the solution including the sample S is dropped to the plurality of through-holes 20 from the first surface 2a side, the solution moves to the second surface 2b side through the plurality of through-holes 20, and the components S1 of the sample S in the solution stay on the first surface 2a side in an appropriate state. Therefore, when the first surface 2a is irradiated with the laser beam L while a voltage is applied to the first conductive layer 41, the components S1 of the sample S are reliably ionized. Further, for example, when the sample support body 1 is disposed such that the first surface 2a faces the sample S, the components S1 of the sample S move smoothly to the second surface 2b side through the plurality of through-holes 20 and stay on the second surface 2b side in an appropriate state. Therefore, when the second surface 2b is irradiated with the laser beam L while a voltage is applied to the second conductive layer 42, the components S1 of the sample S are reliably ionized. Therefore, according to the sample support body 1, a signal intensity of the ionized components S1 of the sample S can be improved in mass spectrometry.

Further, in the sample support body 1, when viewed in the thickness direction of the substrate 2, the outer edge of the first opening 20a is located outside the outer edge of the second opening 20b in each of the plurality of through-holes 20. Accordingly, for example, when the solution including the sample S is dropped to the plurality of through-holes 20 from the first surface 2a side, the components S1 of the sample S in the solution can stay on the first surface 2a side in a more appropriate state. Further, for example, when the sample support body 1 is disposed such that the first surface 2a faces the sample S, the components S1 of the sample S move more smoothly to the second surface 2b side through the plurality of through-holes 20, and the components S1 of the sample S can stay on the second surface 2b side in a more appropriate state.

Further, in the sample support body 1, each of the plurality of through-holes 20 includes the first portion 21 on the first opening 20a side and the second portion 22 on the second opening 20b side. The first portion 21 has a funnel shape expanding toward the first opening 20a. Accordingly, for example, when the solution including the sample S is dropped to the plurality of through-holes 20 from the first surface 2a side, the components S1 of the sample S in the solution can stay on the first surface 2a side in an appropriate state. Further, for example, when the sample support body 1 is disposed such that the first surface 2a faces the sample S, the components S1 of the sample S move smoothly to the second surface 2b side through the plurality of through-holes 20, and the components S1 of the sample S can stay on the second surface 2b side in an appropriate state.

Further, in the sample support body 1, in each of the plurality of through-holes 20, the minimum value of the width is 1 nm and the maximum value of the width is 700 nm. Accordingly, for example, when the solution including the sample S is dropped to the plurality of through-holes 20 from the first surface 2a side, the components S1 of the sample S in the solution can be made to stay on the first surface 2a side in an appropriate state. Further, for example, when the sample support body 1 is disposed such that the first surface 2a faces the sample S, the components S1 of the sample S can move smoothly to the second surface 2b side through the plurality of through-holes 20, and the components S1 of the sample S can stay on the second surface 2b side in an appropriate state.

According to the ionization method and the mass spectrometry method of the embodiment and another embodiment described above, since the sample support body 1 provided with the first conductive layer 41 and the second conductive layer 42 described above is used, it is possible to improve the signal intensity of the components S1 of the ionized sample S in mass spectrometry.

Figure 11:
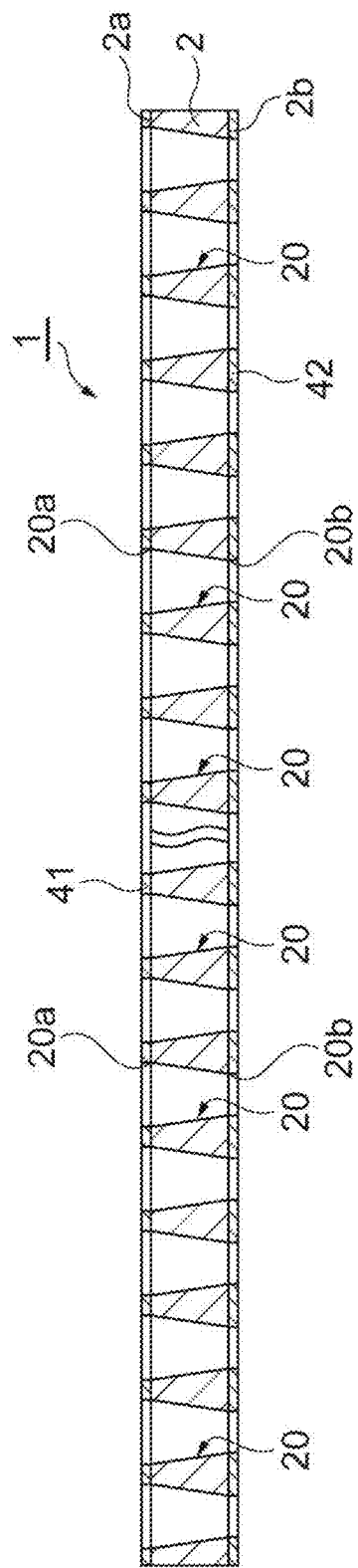
FIG. 11 is a sectional view of a sample support body according to a modification example.

The present disclosure is not limited to the embodiments described above. For example, as illustrated in FIG. 11, each of the plurality of through-holes 20 may have a frustum shape expanding toward the first opening 20a. In this case as well, for example, when the solution including the sample S is dropped to the plurality of through-holes 20 from the first surface 2a side, the components S1 of the sample S in the solution can stay on the first surface 2a side in an appropriate state. Further, for example, when the sample support body 1 is disposed such that the first surface 2a faces the sample S, the components S1 of the sample S can move smoothly to the second surface 2b side through the plurality of through-holes 20, and the components S1 of the sample S can stay on the second surface 2b side in an appropriate state. Further, in this case, strength of the substrate 2 can be improved. Moreover, since an irradiation area of the laser beam L is increased, the signal intensity of the ionized components S1 of the sample S in the mass spectrometry can be improved. The shape of each of the through-holes 20 is not limited to the shape described above and need only be a shape in which the width of the first opening 20a on the first surface 2a side is larger than the width of the second opening 20b on the second surface 2b side (for example, a shape in which the width of the through-holes 20 increase continuously or stepwise toward the first opening 20a). However, when viewed in the thickness direction of the substrate 2, the outer edge of the first opening 20a is preferably located outside the outer edge of the second opening 20b in each of the plurality of through-holes 20.

Further, in the embodiments described above, one predetermined region (a predetermined region for ionizing components of the sample S) is provided in the substrate 2, but a plurality of predetermined regions may be provided in the substrate 2. Further, the plurality of through-holes 20 need not be formed in only the predetermined region. As in the embodiments described above, for example, the plurality of through-holes 20 may be formed in the entire substrate 2. That is, the plurality of through-holes 20 need only be formed in at least the predetermined region. Further, in the embodiments described above, the sample S is disposed such that one sample S corresponds to one predetermined region, but the sample S may be disposed such that a plurality of samples S correspond to one predetermined region. Further, a conductive layer may be provided on an inner surface of each of the through-holes 20. Further, a frame may be attached to the substrate 2. In such a case, handling of the sample support body 1 is facilitated, and deformation of the substrate 2 due to a temperature change or the like is curbed.

Further, the sample support body 1 may include a conductive substrate 2. In this case as well, for example, when a solution including the sample S is dropped to the plurality of through-holes 20 from the first surface 2a side, a solution moves to the second surface 2b side through the plurality of through-holes 20, and the components S1 of the sample S in the solution stay on the first surface 2a side in an appropriate state. Therefore, when the first surface 2a is irradiated with the laser beam (energy beam) L while a voltage is applied to the substrate 2, the components S1 of the sample S are reliably ionized. Further, for example, when the sample support body 1 is disposed such that the first surface 2a faces the sample S, the components S1 of the sample S move smoothly to the second surface 2b side through the plurality of through-holes 20 and stay on the second surface 2b side in an appropriate state. Therefore, when the second surface 2b is irradiated with the laser beam (energy beam) L while a voltage is applied to the substrate 2, the components S1 of the sample S are reliably ionized. Thus, even in a case in which the sample support body 1 is provided with the conductive substrate 2, the signal intensity of the components S1 of the ionized sample S in mass spectrometry can be improved. In this case, the first conductive layer 41 and the second conductive layer 42 can be omitted in the sample support body 1.

Further, in the second process, the sample support body 1 may be fixed to the slide glass 6 by means other than the tape 7 (for example, means using an adhesive, a fixing tool, or the like). Further, in the third process, a voltage may be applied to the first conductive layer 41 or the second conductive layer 42 without having the mount surface 6a of the slide glass 6 and the tape 7 therebetween. In such a case, the slide glass 6 and the tape 7 do not have to be conductive. Further, the tape 7 may be a part of the sample support body 1. In a case in which the tape 7 is a part of the sample support body 1 (that is, in a case in which the sample support body 1 includes the tape 7), for example, the tape 7 may be fixed to the first surface 2a side on a circumferential edge of the substrate 2 in advance.

Further, in the mass spectrometer 10, the laser beam irradiation part 13 may collectively irradiate the predetermined region on the first surface 2a or the predetermined region on the second surface 2b with the laser beam L, and the ion detection unit 15 may detect the sample ions S2 while maintaining two-dimensional information of the region. That is, the mass spectrometer 10 may be a projection mass spectrometer. Further, the ionization method described above can also be used for other measurements such as ion mobility measurements and other experiments.

Further, the purpose of the sample support body 1 is not limited to ionization of the sample S using irradiation with the laser beam L. The sample support body 1 can be used for ionization of the sample S using irradiation with an energy beam such as a laser beam, an ion beam, or an electron beam. In the ionization method and the mass spectrometry method described above, the sample S can be ionized using irradiation with an energy beam.

Further, in the ionization method and the mass spectrometry method according to another embodiment described above, the sample S is not limited to a water-containing sample and may be a dried sample. In such a case, in the second process, after the sample support body 1 is mounted on the mount surface 6a such that the first surface 2a faces the sample S, a predetermined solution is dropped to the plurality of through-holes 20 from the second surface 2b side, for example. Accordingly, the components S1 of the sample S can move smoothly to the second surface 2b side through the plurality of through-holes 20, and the components S1 of the sample S can stay on the second surface 2b side in an appropriate state. Further, in the second process, a solution including the sample S may be mounted on the mount surface 6a, and the sample support body 1 may be mounted on the mount surface 6a such that the first surface 2a faces the solution including the sample S. In such a case as well, the components S1 of the sample S can move smoothly to the second surface 2b side through the plurality of through-holes 20, and the components S1 of the sample S can stay on the second surface 2b side in an appropriate state.

REFERENCE SIGNS LIST

1: sample support body, 2: substrate, 2a: first surface, 2b: second surface, 6: slide glass (mount portion), 6a: mount surface, 20: through-hole, 20a: first opening, 20b: second opening, 21: first portion, 22: second portion, 41: first conductive layer, 42: second conductive layer, L: laser beam (energy beam), S: sample, S1: component.

The invention claimed is:

1. A sample support body for ionization of a sample, the sample support body comprising:
a substrate including a first surface and a second surface on sides opposite to each other;
a first conductive layer provided on the first surface; and
a second conductive layer provided on the second surface,
wherein a plurality of through-holes opening on the first surface and the second surface are formed in a predetermined region of the substrate, the predetermined region being for ionizing components of the sample, and
wherein a width of a first opening on the first surface side is larger than a width of a second opening on the second surface side in each of the plurality of through-holes.

2. The sample support body according to claim 1,
wherein when viewed in a direction in which the first surface and the second surface are opposite to each other, an outer edge of the first opening is located outside an outer edge of the second opening in each of the plurality of through-holes.

3. The sample support body according to claim 1,
wherein each of the plurality of through-holes includes a first portion on the first opening side and a second portion on the second opening side, and
wherein the first portion has a funnel shape expanding toward the first opening.

4. The sample support body according to claim 1,
wherein each of the plurality of through-holes has a frustum shape expanding toward the first opening.

5. The sample support body according to claim 1,
wherein a minimum value of the width is 1 nm and a maximum value of the width is 700 nm in each of the plurality of through-holes.

6. An ionization method comprising:
a first process of preparing the sample support body according to claim 1;
a second process of mounting the sample support body on a mount surface of a mount portion such that the second surface faces the mount surface, and dropping a solution including the sample to the plurality of through-holes from the first surface side; and
a third process of ionizing components of the sample staying on the first surface side by irradiating the first surface with an energy beam while applying a voltage to the first conductive layer.

7. A mass spectrometry method comprising:
the first process, the second process, and the third process of the ionization method according to claim 6; and
a fourth process of detecting the components ionized in the third process.

8. An ionization method comprising:
a first process of preparing the sample support body according to claim 1;
a second process of mounting the sample on a mount surface of a mount portion, and mounting the sample support body on the mount surface such that the first surface faces the sample; and
a third process of ionizing components of the sample having moved to the second surface side through the plurality of through-holes by irradiating the second surface with an energy beam while applying a voltage to the second conductive layer.

9. A mass spectrometry method comprising:
the first process, the second process, and the third process of the ionization method according to claim 8; and
a fourth process of detecting the components ionized in the third process.

10. A sample support body for ionization of a sample, the sample support body comprising:
a conductive substrate including a first surface and a second surface on sides opposite to each other,
wherein a plurality of through-holes opening on the first surface and the second surface are formed in a predetermined region of the substrate, the predetermined region being for ionizing components of the sample, and
wherein a width of a first opening on the first surface side is larger than a width of a second opening on the second surface side in each of the plurality of through-holes.

11. An ionization method comprising:
a first process of preparing the sample support body according to claim 10;
a second process of mounting the sample support body on a mount surface of a mount portion such that the second surface faces the mount surface, and dropping a solution including the sample to the plurality of through-holes from the first surface side; and
a third process of ionizing components of the sample staying on the first surface side by irradiating the first surface with an energy beam while applying a voltage to the substrate.

12. A mass spectrometry method comprising:
the first process, the second process, and the third process of the ionization method according to claim 11; and
a fourth process of detecting the components ionized in the third process.

13. An ionization method comprising:
a first process of preparing the sample support body according to claim 10;
a second process of mounting the sample on a mount surface of a mount portion, and mounting the sample support body on the mount surface such that the first surface faces the sample; and
a third process of ionizing components of the sample having moved to the second surface side through the plurality of through-holes by irradiating the second surface with an energy beam while applying a voltage to the substrate.

14. A mass spectrometry method comprising:
the first process, the second process, and the third process of the ionization method according to claim 13; and
a fourth process of detecting the components ionized in the third process.

* * * * *